United States Patent [19]

Ogawa

[11] Patent Number: 5,461,083
[45] Date of Patent: Oct. 24, 1995

[54] FORMED PLASTIC AND METHOD OF MANUFACTURING THE SAME

[75] Inventor: Kazufumi Ogawa, Osaka, Japan

[73] Assignee: Matsushita Electric Industrial Co., Ltd., Osaka, Japan

[21] Appl. No.: 913,727

[22] Filed: Jul. 16, 1992

[30] Foreign Application Priority Data

Jul. 26, 1991 [JP] Japan ..................... 3-187696

[51] Int. Cl.⁶ ......................................... C08J 9/04
[52] U.S. Cl. .................. 521/99; 428/35.8; 428/71; 428/304.4; 428/305.5; 428/308.4; 264/48; 264/424; 521/50; 521/50.5; 521/424; 521/110; 521/128; 521/134; 521/136; 521/137; 521/138; 521/139; 521/141; 521/142; 521/146; 521/155; 522/6; 523/400
[58] Field of Search .................. 428/35.8, 71, 304.4, 428/305.5, 308.4; 264/22, 48; 521/50, 50.5, 110, 134, 136, 137, 138, 139, 141, 142, 146, 155, 128, 99; 522/6; 523/400

[56] References Cited

U.S. PATENT DOCUMENTS

| | | |
|---|---|---|
| 3,723,318 | 3/1973 | Butler . |
| 4,419,459 | 12/1983 | Melchior ..................... 521/54 |
| 4,898,893 | 2/1990 | Ashida ..................... 521/139 |
| 5,137,929 | 8/1992 | Demmin et al. ..................... 521/99 |
| 5,169,873 | 12/1992 | Behme et al. ..................... 521/114 |

FOREIGN PATENT DOCUMENTS 91-4121161   6/1991   Germany .

OTHER PUBLICATIONS

CA-99:158,922, Dec. 1983.
Database WPIL (Derwent), accession No. 83-15929K(07), Derwent Publications Ltd., London, GB & JP-A-58 011 714 (Shinetsu Chem. Ind. K.K.) Jul. 1, 1983.

Primary Examiner—Nathan M. Nutter
Assistant Examiner—John M. Cooney, Jr.
Attorney, Agent, or Firm—Fish & Richardson

[57] ABSTRACT

A foamed plastic manufactured by foaming a mixture of a resin and a volatile polymerizable foaming agent, wherein the pressure in the foams of the foamed plastic is less than atmospheric pressure, is disclosed. Further, a foamed plastic manufactured by hermetically sealing with an airtight film and foaming a mixture of a resin and a volatile polymerizable foaming agent, wherein the pressure in a gap region between the airtight film and the foamed plastic and the pressure in the foams of the foamed plastic are less than atmospheric pressure is disclosed. Further, a method of manufacturing foamed plastic comprising foaming a mixture of a volatile polymerizable foaming agent and a resin, and irradiating the foamed plastic with an energy beam. According to the invention, to enhance the heat insulation and soundproof performance a volatile liquid polymerizable monomer is used as foaming agent, and irradiated with an energy beam to polymerize the foaming agent after forming, and to maintained a reduced internal pressure, the foamed plastic is further covered by a metal film or laminated film.

2 Claims, 1 Drawing Sheet

FORMED PLASTIC AND METHOD OF MANUFACTURING THE SAME

FIELD OF THE INVENTION

The present invention relates to foamed plastics useful in soundproofing and heat insulating materials, and more particularly to foamed plastics comprising many foamed cells.

BACKGROUND OF THE INVENTION

It has been known that properties such as heat insulation, sound absorption, buoyancy, elasticity and weight reduction are improved by foaming plastics either mechanically by using a reactive gas or by using foaming agents. Such foamed plastics are widely used as soundproofing materials, heat insulation, building materials, lightweight structural materials, packaging materials, insulating materials, cushioning materials, and quakeproof materials, as well as in footwear, automobile interiors, and in other products. Many usable resins are known, and various foaming techniques are also known.

To save energy, resources and space, it is desirable to improve the heat insulation and soundproofing capabilities in materials that are as thin as possible.

To improve the heat insulation or soundproofing performance per unit thickness, it is desirable to maintain a vacuum inside the foamed plastics. Vacuum pumps, as generally known, are incapable of maintaining individual vacuums in the foamed plastics, and consequently the heat insulation and soundproofing capabilities are not satisfactory.

SUMMARY OF THE INVENTION

It is an object of the invention to solve the above-discussed problems, by providing foamed plastics enhanced in heat insulation and soundproofing qualities and a method of manufacturing the same.

According to a first aspect of the invention, a foamed plastic comprises many foamed cells in the formed resin. The pressure in the foamed cells is less than atmospheric pressure, and a polymerized volatile polymerizable foaming agent is contained in the foamed cells.

It is also preferable for metal to be deposited on the surface of the foamed plastic.

It is preferable in this invention that the foamed plastic comprises at least one resin selected from the group consisting of polystyrene resin, vinyl chloride resin, polyurethane resin, phenol resin, urea resin, epoxy resin, polyethylene resin, polypropylene resin, methacryl resin and silicone resin.

According to a second aspect of the invention, a foamed plastic comprises many foamed cells in a formed resin covered with an airtight film. The pressure in the foamed cells and the pressure in a gap region between the airtight film and the formed resin is less than atmospheric pressure, and a polymerized volatile polymerizable foaming agent is contained in the foamed cells and gap region.

It is preferable in this aspect of the invention that the airtight film is at least one film selected from the group consisting of polyvinylidene chloride, polyvinyl chloride, polyethylene, polypropylene, polybutadiene, nylon, polycarbonate, cellophane, polyvinyl alcohol, polyester, metal deposition resin film, and aluminum foil.

It is preferable in this aspect of the invention that the foamed plastic comprises at least one resin selected from the group consisting of polystyrene resin, vinyl chloride resin, polyurethane resin, phenol resin, urea resin, epoxy resin, polyethylene resin, polypropylene resin, methacryl resin and silicone resin.

According to a third aspect of the invention, a method of manufacturing a foamed plastic comprises foaming and curing a mixture of a volatile polymerizable foaming agent and a resin, and irradiating the formed resin containing many foamed cells with an energy beam.

It is preferable in this aspect of the invention for the surface of the foamed plastic to be covered with a deposited metal.

It is additionally preferable in this aspect of the invention for the polymerizable foaming agent to be a monomer possessing unsaturated carbon bonding.

According to a fourth aspect of the invention, a method of manufacturing foamed plastic comprises sealing a mixture of a resin and a volatile polymerizable foaming agent in an airtight film, foaming and forming the mixture and irradiating the foamed and formed mixture with an energy beam through the airtight film.

It is preferable in this aspect of the invention that the polymerizable foaming agent is a monomer possessing an unsaturated carbon bonding.

According to the first aspect of the invention, by polymerizing the foaming agent, the foaming agent is solidified. The internal region of the foamed cells or the gap region between the airtight film and the formed resin may be reduced in pressure by initially applying a vacuum. As a result, foamed plastics can be realized which have improved heat insulation and soundproofing capabilities.

It is preferable for a metal to be deposited or vaporized on to the surface of the formed resin. The internal region of the foamed cells, or the gap region may be reduced by initially applying a vacuum.

According to the second aspect of the invention, the pressure in the internal region of the foamed cells, and the pressure in the gap region between the airtight film and formed resin are maintained below atmospheric pressure for a longer period of time by covering the formed resin with a metal film or laminated film.

It is preferable to deposit a metal layer on the surface of the formed resin after it has been irradiated by an electron beam because a reduced pressure may be maintained in the interior of the foamed cells and in the gap between the resin and the film.

In the preferred embodiments of the first and second aspects of the invention, the polymerizable foaming agent contains unsaturated carbon bonding, and the foaming agent is polymerized by irradiation with an energy beam to reduce the internal region of the foamed cells and the gap after foaming.

According to the invention, by reducing the pressure inside the foamed cells and the gap region between the airtight film and the formed resin, the soundproofing and heat insulating capabilities of the foamed plastics are improved.

Other features and advantages will become apparent from the following description and from the claims.

DETAILED DESCRIPTION OF THE INVENTION

Figure 1A:
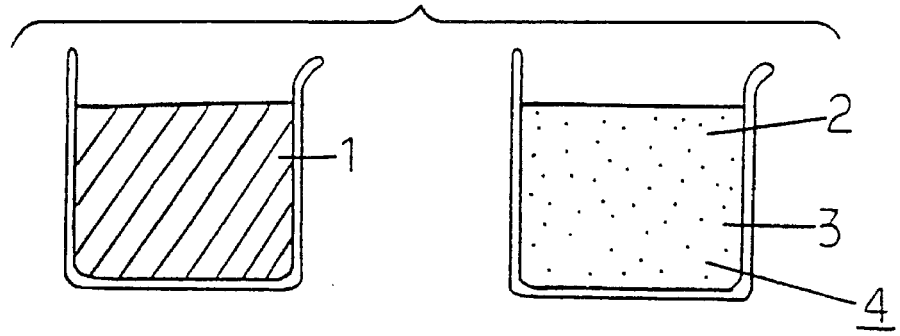
FIGS. 1(a) to (d) are cross sectional views of a process for manufacturing foamed polyurethane.
Figure 1B:
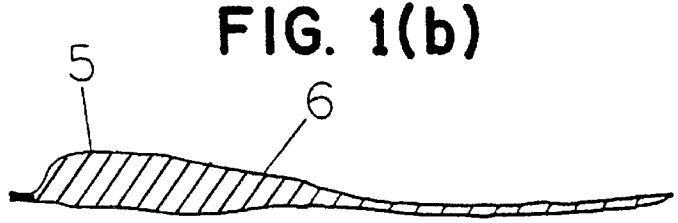
Figure 1C:
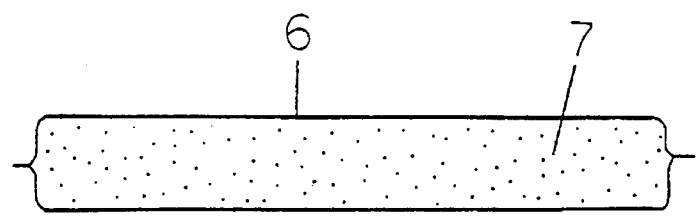

According to the invention, the foamed plastic of the invention has solved the problems of the prior art by polymerizing a foaming agent. The insulating and soundproofing capabilities are enhanced by using a volatile liquid polymerizable monomer as a foaming agent, irradiating this foam with an energy beam to polymerize the foaming agent, and reduce the pressure inside the foamed cells. For example, if $CF_2=CFOC_3F_7$ (b.p. 35° C.) as a foaming agent is mixed with a foam material polyol and irradiated with an energy beam such as an electron beam, X-ray, γ-ray, ultra violet ray, etc., the foaming agent (polymerizable monomer) present inside the independent foamed cells contained in the formed resin will be polymerized, thereby enhancing the soundproofing and heat insulating capabilities of the material.

The foamed plastic of the invention contains a volatile polymerizable foaming agent, and may be manufactured by mixing a foaming agent and plastic material or resin, and irradiating this foamed mixture with an energy beam.

Before the foaming step and after deaerating and sealing the resin material in an airtight film, it may be also possible to foam and irradiate with the energy beam. Thus, the polymerizable monomer is solidified, and the inside of the foamed cells or gaps between the foamed plastic and airtight film can be reduced in pressure. In the second manufacturing method, a mixture of the foaming agent and the resin is initially sealed in an airtight film.

The foamed plastic of the invention may be classified as two types. One is the formed resin containing many foamed cells, and the other is the formed resin covered with an airtight film. The manufacturing method for the formed resin alone comprises using a volatile polymerizable monomer as a foaming agent, foaming after mixing the foaming agent and plastic resin and irradiating the foamed plastic with an energy beam to polymerize the foaming agent inside the foamed cells, thereby producing a foamed plastic which is excellent in soundproofing and heat insulating effects. The manufacturing method for the foamed resin using an airtight film covering comprises using a volatile liquid polymerizable monomer as a foaming agent, hermetically sealing the mixture of the foaming agent and plastic resin an airtight film, a step of foaming the mixture, and irradiating the formed resin with an energy beam to polymerize the foaming agent present in the foamed cells and the gap region between the airtight film and the formed resin, thereby maintaining a foamed plastic high in soundproofing and heat insulating effects.

The manufacturing method for the foamable resin is achieved by, for example, suspension polymerization of a monomer containing a foaming agent, by extruding foamable beads obtained by ordinary means such as impregnation or diffusion by setting pellets or spherical plastic and a diffusion solution containing the foaming agent in a pressure kiln, foaming mixing the plastic material and the foaming agent, or any other methods widely employed in this field.

As the plastic materials of the invention, thermoplastic resins or thermosetting resins may be used. Among these resins, for example, polystyrene, polyethylene, polyvinyl chloride, polyurethane, phenol resin, urea resin, epoxy resin, silicone resin and acrylic resin are particularly desired because they are applicable in wide fields. When using thermosetting resins, catalysts such as reaction promoters and reaction retarders may be used as required. For example, radical polymerization initiators such as benzoyl peroxide and azoisobutyronitrile, which are known hardening catalysts, may be preliminarily added to the foaming agent monomer or plastic material as the thermosetting catalyst for polymerizing the foaming agent monomer.

The foamed plastic of the invention is based on the technical concept of enhancing the heat insulating and soundproofing effects by polymerizing the foamed cells in the foaming agent so that the pressure inside of the foamed plastic may be lower than the atmospheric pressure. Therefore, by using foaming agents having an unsaturated carbon bond such as a double bond group of carbon (C=C) or a triple bond group of carbon (C≡C) (ethynyl group), it is possible to polymerize and solidify easily by irradiation with an energy beam or the like, which is very convenient. For example, the following compounds may be used. In the following list, the boiling point is abbreviated as b.p.

(1) b.p. 35° C.: $CF_2=CFOC_3F_7$ or $CHCl=CClF$
(2) b.p. 30° C.: $CF_3CF_2CF_2CH=CH_2$ or $CF_2=CFI$
(3) b.p. 40° C.: $CF_3COOCH=CH_2$
(4) b.p. 54° C.: $CH_2=CHC_4H_9$
(5) b.p. 63° C.: $CH_2=CHCH_2N(CH_3)_2$
(6) b.p. 81° C.: $F(CF_2)_5CF=CF_2$
(7) b.p. 73° C.: $CH_2=CHCF_2CF_2CH=CH_2$
(8) b.p. 71° C.: $CCl_2=CClF$

These foaming agents may be used either alone or in combination. The foaming agent may be mixed together with an additive, such as a foam shaping agent according to conventional procedure.

Furthermore, it is preferable to deposit a metal on the surface of the formed resin, to reduce heat radiation. As the metal material, for example, ordinary metal materials high in reflectivity such as aluminum and silver may be used.

As the airtight film for covering the foamed plastic of the invention, any highly airtight film may be used. Examples thereof include a polyvinylidene chloride film, a polyethylene film, a polyester film and a polybutadiene film. More preferably, these films are laminates containing a thermosensitive adhesive because the formed resin may be tightly sealed. It is more desirable if the film is a metal deposition film formed by aluminum deposition, silver deposition or the like, or a metal foil such as aluminum foil and silver foil because the radiation heat may be reduced.

The term "independent foamed cell type" means that the foamed cell is divided completely at the polymer resin, and the term "continuous foamed cell type" means that the foamed cells are continuous in the polymer resin. There is no doubt that the invention can use a mixture of the independent foamed cell type and continuous foamed cell type.

Embodiments of the invention are described below with reference to illustrative examples. The first example relates to the type of formed resin alone (independent foamed cell type).

EXAMPLE 1

50 g of a base polymer such as polyester based polyol with an average molecular weight of about 2000, produced by the condensation polymerization of adipic acid (or phthalic anhydride) and ethylene glycol (or propylene glycol, glycerin, trimethylol propane, etc.), or polyalkylene based ether polyol with an average molecular weight of about 2000, produced by the addition polymerization of ethylene oxide (or propylene oxide or butyrene oxide) and glycerin (or sorbitol), and 30 g of a volatile foaming agent having an unsaturated group, such as $CF_2=CFOC_3F_7$ (b.p. 35° C.) were blended by hand to prepare 80 g of foaming hardening liquid, and then mixed further with 60 g of a hardening agent such as a hexamethylene diisocyanate (commercial products include Crude MDI, Crude TDI, Prepolymer MDI, Prepolymer TDI of Asahi Glass Co., and others). Theoretically, the mixing ratio of the alcohol group and isocyanate group should be nearly equimolecular. The mixture was immediately put into a forming container having a gap of about 5 cm. Then, the mixture was foamed by reaction with heat because the boiling point of the foaming agent was 35° C., and was solidified in scores of seconds to several minutes, thereby producing foamed polyurethane (independent foam type).

Then the foamed urethane resin was taken out of the forming container and irradiated with about 5 to 100 Mrads (preferably 10 to 20 Mrads) from an electron beam accelerated to about 800 KeV. Electron rays were also transmitted sufficiently at a thickness of about 5 cm. The $CF_2$=$CFOC_3F_7$, which was the volatile foaming agent with an unsaturated group in the independent foam, was polymerized by irradiation to form a solid polymer, and then the space in the independent foamed cells was evacuated. At this time, by adding 1 g of benzoyl peroxide to 30 g of the $CF_2$=$CFOC_3F_7$, the $CF_2$=$CFOC_3F_7$ could be polymerized to a higher molecular weight.

The thus prepared foamed and formed polyurethane was improved in heat insulating characteristics by a factor of about 2, compared with the material without electron ray irradiation. The soundproofing effect was also improved about twice as much.

On the surface of the thus obtained foamed and formed urethane resin, when a metal of high heat ray reflection effect such as aluminum was vacuum deposited at around 1000 Angstroms (100 nm), the heat radiation was considerably reduced, and the heat insulating effect was further enhanced. Moreover, when irradiated with electron rays after sealing with an Al laminate film in a vacuum after foaming and forming, the durability and heat insulating were both enhanced.

Furthermore, by adding a surface active agent of several percent of dimethyl siloxane as a foam shaping agent, the foam building force and foam stability were enhanced. To encourage the reaction of polyol and isocyanate, a catalyst such as a tertiary amine (for example, pentamethyldiethylene triamine) or organic tin (for example, dibutyl tin dilaurate) is added, thereby promoting resin formation.

In order to improve the properties, the polyol, hardening agent and foaming agent may be selected as needed, or blends may be used. In particular, when using a blended monomer with a few foaming agents, a copolymer is produced by the irradiation, and the pressure reducing effect became larger.

When using a foaming agent having a boiling point around 60° C., after mixing the hardening agent containing polyol and the foaming agent, it is necessary to heat to about 100° C. for the formation.

EXAMPLE 2

In this embodiment, an example of the type having a covering of an airtight film is shown. As shown in FIG. 1, 50 g of base polymer such as polyester based polyol having an average molecular weight of about 2000, produced by the condensation polymerization of adipic acid (or phthalic anhydride) and ethylene glycol (propylene glycol, glycerin, trimethylolpropane, etc.), or polyalkylene based ether polyol having an average molecular weight of about 2000 produced by the addition polymerization of ethylene oxide (propylene oxide, butyrene oxide, etc.) and to glycerin (or sorbitol), 30 g of a volatile foaming agent 2 having an unsaturated group such as $CH_2$=$CHCH_2N(CH_3)_2$ (b.p. 63° C.) or, $F(CF_2)_5CF$=$CF_2$ (b.p. 81° C.), $CH_2$=$CHCF_2CF_2CH$=$CH_2$ (b.p. 73° C.) or $CCl_2$=$CClF$ (b.p. 71° C.), and 5 g of calcium stearate were blended by hand to prepare 85 g of foaming hardening liquid, and then mixed further with 60 g of a hardening agent 3 such as hexamethylene diisocyanate (FIG. 1(a)), and the mixed solution 5 of polyol 1 and foaming hardening liquid 4 (the theoretical mixing ratio of the alcohol group and isocyanate group should be nearly equimolecular) was immediately put into an Al laminate film bag 6, and then deaerated and sealed. (FIG. 1(b)).

Then, the bag was gripped by a heating panel with a gap of about 5 cm and heated at about 100° C. The mixture was foamed and cured in several minutes, and continuous polyurethane type foamed resin 7 was sealed hermetically to form a heat insulating material (FIG. 1(c)).

Later, the covered heat insulating material was taken out of the heating plate, and irradiated with about 20 Mrads of electron beam 8 accelerated to about 800 KeV, where, at a thickness of about 5 cm, electron rays penetrated sufficiently. On the other hand the volatile foaming agent $CH_2$=$CHCH_2N(CH_3)_2$ possessing the unsaturated group could be polymerized by irradiation with electron rays, and the pressure inside the foamed cells and the gap region was reduced while maintaining the shape of the bag.

Figure 1D:
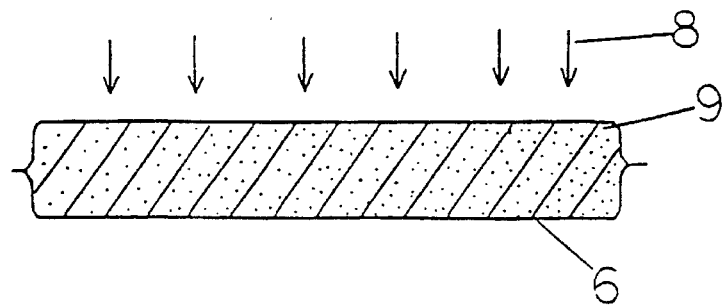

The foamed and formed polyurethane insulating material 9 (FIG. 1(d)) prepared in this way was improved in the heat insulating characteristics by about three times as compared with the material without irradiation with electron rays. The soundproofing effect was also improved about three times.

Aside from the above embodiments, a granular polystyrene resin (independent foamed cell type) may be prepared by adding a volatile foaming agent possessing an unsaturated group, such as perfluoroheptene, to polystyrene, gripping the combination in heating plates heated at about 120° C. with a gap of about 5 cm, and foaming and curing for about scores of seconds to several minutes. By controlling the concentration of foaming agent in the resin and adding a surface active agent, the foamed polystyrene of independent foamed cell type (many foamed cells in the foamed polystyrene are separated with a wall individually) or the foamed polystyrene of continuous foam type (many foamed cells are connected with each other without a wall) may be prepared as desired.

After taking out the foamed polystyrene from the heating plate by hand, and then irradiating the foamed polystyrene with about 10 to 100 Mrads of electron beams accelerated to about 800 KeV, at a thickness of about 5 cm, electron rays penetrated sufficiently, and the volatile foaming agent possessing an unsaturated group such as perfluoroheptene in the independent foam type was polymerized by electron rays, so that the pressure inside the foamed cell could be reduced.

By mixing the volatile foaming agent possessing the unsaturated group such as $CH_2$=$CHCF_2CF_2CH$=$C_2$ in the vinyl chloride resin, and heating at about 200° C., a foamed polyvinyl chloride of the independent foamed cell type was prepared. (By controlling the concentration of foaming agent in the resin and adding a surface active agent, either a foamed polyvinyl chloride of the independent foamed cell type or a foamed polyvinyl chloride of the continuous foamed cell type may be manufactured as desired.)

After taking out the foamed polyvinyl chloride from the heating plate by hand, and irradiating with about 10 to 100

Mrads of electron beams accelerated to about 800 KeV, the electron rays penetrated sufficiently, and the volatile foaming agent possessing an unsaturated group of $CH_2=CHCF_2CF_2CH=CH_2$ in independent foams is polymerized with electron rays, so that the pressure inside the individual independent foamed cells may be reduced.

Furthermore, by preliminarily preparing resol type condensate or novolak condensate, and mixing with the volatile foaming agent having an unsaturated group such as $CCl_2=CClF$ and putting it in a mold, when heated to about 150° C., a foamed phenol resin of the independent foamed cell type is prepared. At this time, by controlling the concentration of the foaming agent in the resin and adding a surface active agent, either a foamed phenol resin of the independent foamed cell type or a foamed phenol resin of the continuous foamed cell type may be manufactured as desired.

After taking out the foamed phenol resin from the heating plate by hand, when irradiated with about 10 to 100 Mrads of electron beams accelerated at about 800 KeV, electron rays penetrated sufficiently, and a volatile foaming agent possessing an unsaturated group such as $CCl_2=CClF$ in independent foamed cells is polymerized by electron rays, and the pressure inside the individual independent foams is reduced.

Aside from the resins used above, by using urea resin, epoxy resin, polyethylene or acrylic resin, foamed plastics with high performance in heat insulation and soundproofing effect may be similarly manufactured.

EXAMPLE 3

The same procedure as in Example 1 was repeated except that $CH_2=CHC_4H_9$ having a b.p. of 54° C. was used as a foaming agent. In the foaming step, foaming by the reaction with heat and curing in scores of seconds to several minutes was carried out, and a foamed polyurethane of the independent foamed cell type was prepared.

Later, taking out the foamed urethane resin from the forming container, when irradiated with about 10 and 20 Mrads of electron ray beams accelerated at about 800 KeV, at a thickness of about 5 cm, electron rays penetrated sufficiently, and the volatile foaming agent $CH_2=CHC_4H_9$ possessing an unsaturated group in independent foamed cells was polymerized by electron rays to become a polymer, and the pressure inside the individual independent foams was reduced.

In the prepared foamed polyurethane, as compared with the material without irradiation with electron rays, the heat insulating performance was improved by about a factor of two. The soundproofing effect was also improved by about a factor of two.

As has been shown, the invention is greatly beneficial to industry.

The invention may be embodied in other specific forms without departing from the spirit or essential characteristics thereof. The above examples are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A foamed plastic containing at least one resin and comprising foamed cells, wherein the pressure at room temperature in the foamed cells is less than atmospheric pressure, a polymerized volatile foaming agent having at least one unsaturated carbon bond is contained in the foamed cells, and the foaming gent is a monomer possessing an unsaturated carbon-containing bond which has a boiling point from 31° C. to 81° C.

2. The foamed plastic according to claim 1, wherein at least one of said resins is selected from the group consisting of polystyrene resin, vinyl chloride resin, polyurethane resin, phenol resin, urea resin, epoxy resin, polyethylene resin, polypropylene resin, methacryl resin and silicone resin.

* * * * *

UNITED STATES PATENT AND TRADEMARK OFFICE
CERTIFICATE OF CORRECTION

PATENT NO. : 5,461,083

DATED : October 24, 1995

INVENTOR(S) : Kazufumi OGAWA et al.

It is certified that error appears in the above-identified patent and that said Letters Patent is hereby corrected as shown below:

Column 8, line 30,
 Claim 1, line 6, "gent" should read --agent--.

Signed and Sealed this

Sixteenth Day of April, 1996

Attest:

BRUCE LEHMAN

Attesting Officer

Commissioner of Patents and Trademarks